(12) United States Patent
May

(10) Patent No.: US 11,418,558 B2
(45) Date of Patent: Aug. 16, 2022

(54) METHOD AND APPARATUS FOR REAL-TIME-CAPABLE DATA TRANSMISSION BETWEEN TWO NETWORKS

(71) Applicant: Robert Bosch GmbH, Stuttgart (DE)

(72) Inventor: Gunther May, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 16/530,712

(22) Filed: Aug. 2, 2019

(65) Prior Publication Data
US 2020/0045093 A1 Feb. 6, 2020

(30) Foreign Application Priority Data
Aug. 6, 2018 (DE) ...................... 10 2018 213 123.6

(51) Int. Cl.
*G06F 15/16* (2006.01)
*H04L 65/611* (2022.01)
*H04L 65/10* (2022.01)
*H04L 45/24* (2022.01)
(Continued)

(52) U.S. Cl.
CPC .......... *H04L 65/4076* (2013.01); *H04L 45/24* (2013.01); *H04L 65/1003* (2013.01); *H04L 65/1069* (2013.01); *H04L 65/602* (2013.01)

(58) Field of Classification Search
CPC ............. H04L 65/4076; H04L 65/1003; H04L 65/1069; H04L 65/602; H04L 45/24
See application file for complete search history.

(56) References Cited

U.S. PATENT DOCUMENTS

2007/0076691 A1* 4/2007 Varney .............. H04L 29/12188
370/352
2010/0238919 A1* 9/2010 Froelich .............. H04M 7/0024
370/352
(Continued)

OTHER PUBLICATIONS

Neumann, Arne et al., Towards Integration of Industrial Ethernet with 5G Mobile Networks, 2018 14th IEEE International Workshop on Factory Communication Systems (WFCS), Jun. 13, 2018, pp. 1-4 (4 pages).

*Primary Examiner* — Farzana B Huq
(74) *Attorney, Agent, or Firm* — Maginot, Moore & Beck LLP

(57) ABSTRACT

A method for real-time-capable data transmission between two networks includes a first real-time-capable communication system having a first real-time mechanism for real-time-capable data transmission set up in a first network. A second real-time-capable communication system having a second real-time mechanism for real-time-capable data transmission is set up in a second network. The first network and the second network are connected to one another via a mapping module which reciprocally maps the first real-time mechanism of the first real-time-capable communication system and the second real-time mechanism of the second real-time-capable communication system to one another. For real-time-capable data transmission from one of the two networks to the other of the two networks, a data packet is transmitted in the one of the two networks according to the real-time mechanism of the real-time-capable communication system set up in the network.

14 Claims, 3 Drawing Sheets

(51) Int. Cl.
*H04L 65/60* (2022.01)
*H04L 65/1069* (2022.01)

(56) References Cited

U.S. PATENT DOCUMENTS

| | | | | |
|---|---|---|---|---|
| 2012/0103772 | A1* | 5/2012 | Iwaki | H01H 13/705 |
| | | | | 200/341 |
| 2015/0103831 | A1 | 4/2015 | Chandhoke et al. | |
| 2015/0373055 | A1* | 12/2015 | Chandhoke | H04L 43/106 |
| | | | | 370/392 |
| 2019/0327636 | A1* | 10/2019 | Dao | H04W 24/08 |

* cited by examiner

METHOD AND APPARATUS FOR REAL-TIME-CAPABLE DATA TRANSMISSION BETWEEN TWO NETWORKS

This application claims priority under 35 U.S.C. § 119 to patent application no. DE 10 2018 213 123.6, filed on Aug. 6, 2018 in Germany, the disclosure of which is incorporated herein by reference in its entirety.

The disclosure relates to a method and an apparatus for real-time-capable data transmission between two networks and to systems for real-time-capable data transmission.

BACKGROUND

In automation and industrial control technology, it is conventional practice to connect components of a machine or installation, in particular control units and field devices, for example electrical controllers, drive regulators, I/O devices etc., to one another in a network. So that movements of different assemblies of the machine can take place synchronously and in a manner matched to one another, for example, it is important that data can be transmitted in real time between the individual machine components networked to one another. In this case, real-time-capable means that transmitted data reach or have reached the desired subscriber at a definable time. For example, real-time-capable field bus networks which are often based on Ethernet, for example Sercos III, EtherCAT, Profinet, Ethernet/IP etc., are used for such networking of industrial machines or machine components.

When networking machines, for example in the field of automation, the term "Industry 4.0" has become common in the meantime. This term should be understood as meaning the networking of machines or installations and, in particular, also their connection to the Internet or the Internet of Things (IoT). In this case, networked devices may be sensors and security cameras through to vehicles and production machines. For example, it is possible in this case to connect a machine to the Internet via mobile radio networks and to connect it, for example, to other machines or else to a remote computing unit system (so-called cloud computing or edge computing).

SUMMARY

Against this background, a method and an apparatus for real-time-capable data transmission between two networks and systems for real-time-capable data transmission are proposed. The following description relates to advantageous configurations.

A first real-time-capable communication system having a first real-time mechanism for real-time-capable data transmission is set up in a first network. A second real-time-capable communication system having a second real-time mechanism for real-time-capable data transmission is set up in a second network. The respective real-time-capable communication system makes it possible, in the respective network, for a corresponding real-time condition to be satisfied and makes it possible for transmitted data packets in the respective network to reach or have reached the desired subscriber at a definable time or within a definable period in a guaranteed manner. In this context, a real-time mechanism for real-time-capable data transmission should be understood as meaning, in particular, mechanisms or measures or protocols which are implemented in the respective network or the respective communication system, with the result that a predefined real-time condition can be complied with within the respective network.

The first and second real-time-capable communication systems and also the first and second real-time mechanisms differ from one another. Real-time-capable data transmission can be ensured within the networks by the respective communication system or the respective real-time mechanism, but this is conventionally not possible between the two networks.

Within the scope of the disclosure, real-time-capable transmission of data even between the two networks is now enabled. For this purpose, the first network and the second network are connected to one another via a mapping module which reciprocally maps the first real-time mechanism of the first real-time-capable communication system and the second real-time mechanism of the second real-time-capable communication system to one another.

For real-time-capable data transmission from one of the two networks to the other of the two networks, a data packet is transmitted in one of the two networks according to the real-time mechanism of the real-time-capable communication system set up in said network and is received by the mapping module. The mapping module maps this real-time mechanism to the real-time mechanism of the real-time-capable communication system set up in the other of the two networks. The data packet is transmitted to the other of the two networks according to the real-time mechanism of the real-time-capable communication system set up in said network.

In particular, the real-time mechanisms should each be understood as meaning so-called quality-of-service mechanisms which ensure that data transmission in the respective network or communication system can comply with a predefined quality of service (QoS) and can satisfy the predefined real-time condition. Real-time mechanisms may relate, in particular, to data packets to be transmitted or the features of said data packets and may characterize or specify said data packets, in particular, in such a manner that the data packets can be prioritized and can be transmitted in real time. Alternatively or additionally, real-time mechanisms may also relate to the network and/or the subscribers networked to one another in the network or properties of the network and/or of its subscribers and can create conditions in the network, in particular, so that data transmission in real time is enabled in the network.

In particular, the first and second real-time mechanisms are each used for the same purpose, but are each implemented in different network-specific ways in the two networks, for example according to different protocols, standards or norms. The first and second communication systems and also the first and second real-time mechanisms therefore differ from one another. Individual, network-specific mechanisms are therefore respectively implemented in each of these two networks in order to enable real-time-capable data transmission in the respective network. However, since the first and second real-time mechanisms differ from one another, these two mechanisms conventionally cannot be used or at least cannot be readily used for real-time-capable data transmission between the two networks, with the result that it is conventionally not possible to transmit data in real time from a subscriber in one network to a subscriber in the other network.

The mapping module now makes it possible to map or translate the different network-specific ways in which the same purpose is respectively achieved by the first and second real-time mechanisms. The mapping module expediently transforms or translates protocols, standards or norms, according to which the first and second real-time mechanisms are implemented in the respective network, into one another. The mapping module therefore enables cross-network real-time-capable data transmission irrespective of the real-time mechanisms or protocols, standards and norms for data transmission in real time which are used in the individual networks.

In particular, data packets, data streams and their protocols are translated by the mapping module during the transition between the two networks in such a manner that the real-time ties which are stipulated or signaled in one of the two networks can be "bequeathed" to the other network and can also be implemented there. Continuous real-time conditions, which can be used by applications in the two networks, can therefore be stipulated over both networks.

The first real-time mechanism and the second real-time mechanism advantageously each relate to prioritization of data packets (so-called prioritization mechanisms). As a result of such prioritization of data packets, real-time-critical, higher-priority data packets can be given priority in situations with increased load. However, the manner in which an appropriate priority can be assigned to data packets often differs in different real-time mechanisms or prioritization mechanisms. For example, a special identifier (for example a so-called QoS flow identifier, QFI) can be used in one of the two real-time mechanisms, in which case data packets with an identical identifier in each case are handled consistently with the same priority. Priorities based on special addresses or tags, for instance MAC addresses and VLAN tags, which are indeed primarily used for other purposes, but a reference to a specific priority is additionally configured, can be stipulated in the other of the two real-time mechanisms, for example. The mapping module now makes it possible to map or translate such different prioritizations of data packets to one another, with the result that priorities stipulated by means of one of the two real-time mechanisms also apply to the other of the two real-time mechanisms.

Alternatively or additionally, the first real-time mechanism and the second-time mechanism advantageously each relate to synchronization of network subscribers (so-called synchronization mechanisms). A common time base is expediently created in the respective network by means of such real-time mechanisms or synchronization mechanisms. Synchronization at the transition point of the two networks is expediently enabled by means of the mapping module, with the result that the same common time base is used in both networks.

Alternatively or additionally, the first real-time mechanism and the second real-time mechanism advantageously each relate to allocation of data transmission capacities, for example in the form of cyclically reserved time slots. Such allocations may vary depending on the real-time mechanism; for example, time slots may have a different length depending on the real-time mechanism or the reservations of individual time slots may differ depending on the real-time mechanism. Allocations of one network, for example length and reservation of the individual time slots, are transferred to the other network, in particular, by means of the mapping module.

For real-time-capable data transmission from one of the two networks to the other of the two networks, the mapping module advantageously maps settings of the data packet transmitted in one of the two networks according to the real-time mechanism of the real-time-capable communication system set up in said network to settings according to the real-time mechanism of the real-time-capable communication system set up in the other of the two networks. The data packet has, in particular, special real-time-based settings or configurations which are allocated to the data packet according to the corresponding network-specific real-time mechanism in the network in which the data packet is emitted, for example a special allocated priority. The mapping module translates these settings or configurations of the data packet, with the result that these translated properties can be understood by means of the network-specific real-time mechanism of the destination network. In particular, a prioritization of data packets can be translated in this manner. For example, the mapping module can transfer the priority stipulated in a corresponding identifier (for example QoS flow identifier, QFI) to corresponding addresses or tags (MAC addresses, VLAN tags) and vice versa.

For real-time-capable data transmission from one of the two networks to the other of the two networks, the mapping module preferably transfers settings in one of the two networks according to the real-time mechanism of the real-time-capable communication system set up in said network to the other of the two networks according to the real-time mechanism of the real-time-capable communication system set up in said network. In this case, one of the two networks expediently acts as a master or superordinate network, the settings of which are adopted in the other network which acts, in particular, as a slave or subordinate network. Real-time-based settings or configurations of the networks are therefore expediently matched to one another or synchronized with one another at the transition point between the networks by means of the mapping module. For example, these settings may relate to the time base of the networks, with the result that a common time base of one network can be transferred to the other and both networks have the same common time base. Alternatively or additionally, the settings may relate, for example, to the allocation of transmission capacities, with the result that time slots of the same length which are accordingly reserved are defined in both networks.

The first network is preferably connected to the mapping module via a first interface, wherein the mapping module can read in and output settings according to the first real-time mechanism via the first interface. Alternatively or additionally, the second network is preferably connected to the mapping module via a second interface, wherein the mapping module can read in and output settings according to the second real-time mechanism via the second interface. In particular, the mapping module can therefore read in settings in one of the two networks and can transfer them to the other of the two networks via these interfaces. Furthermore, the mapping module can expediently read in settings of the data packet and can accordingly change or map them via these interfaces.

In a particularly advantageous manner, the disclosure makes it possible to network machines or installations to one another as part of the so-called "Industry 4.0" and, in particular, to connect them to the Internet or the Internet of Things (IoT). Components of the machine, in particular control units and field devices, for example electrical controllers, drive regulators, I/O devices etc., can be connected to one another in one of the two networks in this case, for example in the first network without restricting generality. An Ethernet-based communication system and/or a real-time-capable field bus, for example Sercos III, EtherCAT, Profinet, Ethernet/IP etc., can be used for this purpose as the corresponding real-time-capable communication system.

The mapping module can now be used to directly network this machine to a further machine, for example, the components of which are connected to one another in the other of the two networks, for example, without restricting generality, in the second network in which a different real-time-capable communication system than in the first network is expediently used.

In a particularly advantageous manner, the machine can be connected to the Internet or the Internet of Things which, without restricting generality, is the second network, for example. Real-time mechanisms of communication systems in automation or industrial control technology, for instance of real-time-capable field buses, partly differ considerably, in particular, from real-time mechanisms of real-time-capable Internet connections, with the result that it is conventionally not readily possible to connect real-time-critical functions of machines via the Internet. This is now enabled by means of the mapping module, with the result that the machine can be expediently connected to further machines or else to a remote computing unit system (so-called cloud computing or edge computing) via the Internet and can communicate in real time. For example, open-loop or closed-loop control circuits can therefore be closed using cloud or edge computing.

The first real-time-capable communication system and/or the second real-time-capable communication system, preferably the first real-time-capable communication system without restricting generality, is/are advantageously based on Ethernet and/or on IEEE 802 standards and/or on TSN standards. The first real-time-capable communication system is expediently used in this case to network components of an automation machine. The first real-time-capable communication system is expediently a real-time-capable field bus based on Ethernet, for example Sercos III, EtherCAT, Profinet, Ethernet/IP etc. IEEE 802 comprises a number of norms or standards in the field of local, in particular wired, networks, in particular Ethernet networks. "Time Sensitive Networking" (TSN) is a number of standards or norms which deal, inter alia, with the synchronization of network subscribers in a network, in particular in order to comply with real-time requirements, in particular during data transmission via Ethernet. TSN standards are becoming increasingly important as part of the Industry 4.0.

The first real-time-capable communication system and/or the second real-time-capable communication system, preferably the second first real-time-capable communication system without restricting generality, is/are preferably a real-time-capable mobile radio network and/or is/are based on 5G standards. After UMTS (3G) and LTE (4G), 5G is the fifth generation of the so-called "Next Generation Mobile Networks" (NGMN for short), a project by mobile radio companies and mobile radio suppliers for developing mobile radio generations. 5G is based on its direct predecessor 4G but, in comparison with the latter, has considerable improvements, in particular a considerably improved real-time behavior.

According to one particularly advantageous configuration of the disclosure, the mapping module reciprocally maps the first real-time mechanism based on TSN standards and the second real-time mechanism based on 5G standards to one another. Communication systems based on TSN and 5G standards each have specific real-time mechanisms, in particular QoS mechanisms, which enable data transmission in real time but partly differ considerably from one another. The mapping module therefore makes it possible to translate or convert the real-time mechanisms according to TSN and 5G standards into one another, as a result of which real-time properties between an Ethernet-based real-time system and a 5G mobile radio system are made compatible with one another in a particularly advantageous manner. It is therefore possible, in a particularly advantageous manner, to connect a machine having a network based on Ethernet or TSN standards to a 5G mobile radio network in real time, in particular as part of the "Industry 4.0".

In this case, the disclosure is advantageously suitable for a wide range of machines and applications, for example for tunnel boring machines, hydraulic punches/presses, general automation processes, semiconductor handling, robotics etc. The disclosure is advantageously suitable for machine tools, for example a welding system, a screwing system, a wire saw or a milling machine, for web processing machines, for example a printing machine, a newspaper printing press, a gravure printing press, a screen printing machine, an in-line flexographic printing press or a packaging machine, or else for (conveyor) installations for producing an automobile or for producing components of an automobile (for example internal combustion engines or control devices).

An apparatus according to the disclosure, for example a router, is set up, in particular in terms of programming and/or hardware, to carry out a method according to the disclosure. Advantages and preferred configurations of the apparatus according to the disclosure and of the method according to the disclosure emerge from the present description in a similar manner.

The apparatus has a first interface which is set up to be connected to a first network in which a first real-time-capable communication system having a first real-time mechanism for real-time-capable data transmission is set up. A second interface is set up to be connected to a second network in which a second real-time-capable communication system having a second real-time mechanism for real-time-capable data transmission is set up. The apparatus also has a mapping module which is set up to reciprocally map the first real-time mechanism of the first real-time-capable communication system and the second real-time mechanism of the second real-time-capable communication system to one another.

The apparatus is expediently in the form of a router or an interface between the two networks. The apparatus or the router may also have yet further expedient elements, for example a distributor or switch and/or a modem of one or both networks. The apparatus or the router preferably has a TSN real-time routing unit, for instance a TSN distributor or a TSN switch, for a real-time-capable communication system based on TSN standards. More preferably, the apparatus or the router has a 5G modem for a real-time-capable communication system based on 5G standards.

The disclosure also relates to a system for real-time-capable data transmission, having a first network having at least one first network subscriber, wherein a first real-time-capable communication system having a first real-time mechanism for real-time-capable data transmission is set up in the first network, and also having a second network having at least one second network subscriber, wherein a second real-time-capable communication system having a second real-time mechanism for real-time-capable data transmission is set up in the second network. The first network and the second network are connected to one another by means of a preferred configuration of an apparatus according to the disclosure.

One of the two communication systems, for example the first communication system without restricting generality, is advantageously based on TSN standards, and the other of the two communication systems, for example the second communication system without restricting generality, is advantageously based on 5G standards. In a particularly advantageous manner, the system is therefore a machine which is networked via Ethernet or TSN standards, is connected to the Internet via a 5G mobile radio network and is networked there, for example, to a remote computing unit system, for example as part of the cloud or edge computing, in particular as part of the so-called "Industry 4.0".

The disclosure also relates to a system for real-time-capable data transmission, having a first network in which a first real-time-capable communication system having a first real-time mechanism for real-time-capable data transmission is set up, a second network in which a second real-time-capable communication system having a second real-time mechanism for real-time-capable data transmission is set up, and a third network in which the first real-time-capable communication system having the first real-time mechanism for real-time-capable data transmission or a third real-time-capable communication system having the third real-time mechanism for real-time-capable data transmission is set up. The first network and the second network are connected to one another by means of a first preferred configuration of an apparatus according to the disclosure. The second network and the third network are connected to one another by means of a second preferred configuration of an apparatus according to the disclosure.

The first real-time-capable communication system which is preferably based on TSN standards is also advantageously set up in the third network. The second communication system is advantageously based on 5G standards. The first and third networks are each used, in particular, to network a machine. These two machines are expediently networked to one another via the Internet by means of a 5G mobile radio network, in particular as part of the so-called "Industry 4.0".

The implementation of the method in the form of a computer program is also advantageous since this gives rise to particularly low costs, in particular if an executing control device is also used for other tasks and is therefore present anyway. Suitable data storage media for providing the computer program are, in particular, magnetic, optical and electrical memories, for example hard disks, flash memories, EEPROMs, DVDs and many more. It is also possible to download a program via computer networks (Internet, intranet etc.).

Further advantages and configurations of the disclosure emerge from the description and the accompanying drawing.

It goes without saying that the features mentioned above and the features yet to be explained below can be used not only in the respectively stated combination but also in other combinations or alone without departing from the scope of the disclosure.

The disclosure is schematically illustrated in the drawing on the basis of exemplary embodiments and is described in detail below with reference to the drawing.

DETAILED DESCRIPTION

Figure 1:
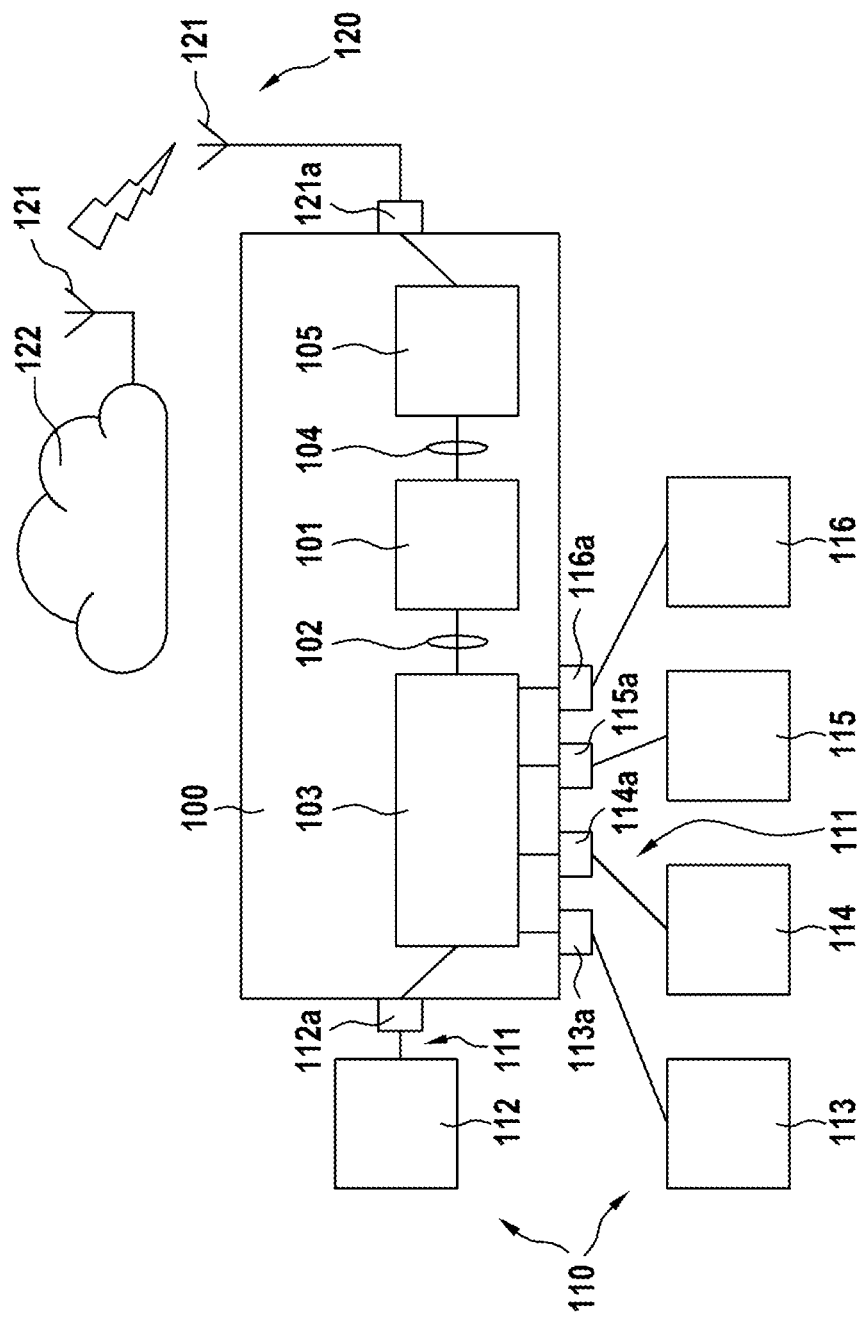
FIG. 1 schematically shows a system for real-time-capable data transmission between two networks having a preferred configuration of an apparatus according to the disclosure which is set up to carry out a preferred embodiment of a method according to the disclosure.

FIG. 1 schematically illustrates a system for real-time-capable data transmission between two networks.

Components of a machine are networked to one another in a first network 110 as part of automation or industrial control technology, for example a control device 112, actuators 113, 114 and sensors 115, 116. It goes without saying that the machine may have yet further components which are not illustrated for the sake of clarity.

These machine components 112, 113, 114, 115, 116 are networked in the first network via a first real-time-capable communication system 111 which is based on Ethernet, IEEE standards and also preferably on TSN standards. For example, the first real-time-capable communication system 111 is a real-time-capable field bus based on Ethernet, for example Sercos III, EtherCAT, Profinet, Ethernet/IP etc.

As part of the "Industry 4.0", the machine or the first network 110 is intended to be connected to the Internet or the Internet of Things (IoT) and is intended to be connected to a remote computing unit system for so-called cloud computing or edge computing, for example.

A corresponding remote computing unit system 122 (for example with a manufacturer, at a maintenance company or in a control center etc.) is provided in a second network 120. A second real-time-capable communication system 121 which is based on 5G standards and is in the form of a 5G mobile radio network is provided in this second network 120.

The field bus 111 or the first communication system 111 has first real-time mechanisms for real-time-capable data transmission, with the result that data transmission in real time is possible within the first network 110.

The 5G mobile radio network 121 or the second communication system 121 likewise has second real-time mechanisms for real-time-capable data transmission, with the result that data transmission in real time is also possible within the second network 120.

For example, these real-time mechanisms each relate to prioritization of data packets, synchronization of network subscribers and allocation of data transmission capacities.

Although these first and second real-time mechanisms are each used for the same purpose, they are implemented in different ways in the respective network, for example based on different standards and protocols. Real-time-capable data transmission between the two networks 110, 120 is therefore conventionally not readily possible.

In order to nevertheless enable real-time-capable data transmission between the networks 110, 120, a preferred configuration of an apparatus 100 according to the disclosure which is in the form of a router, for example, is provided.

The router 100 has a mapping module 101 which is set up to reciprocally map the first real-time mechanism of the first real-time-capable communication system 111 and the second real-time mechanism of the second real-time-capable communication system 121 to one another.

The router 100 also has a first interface 102, via which the mapping module 101 is connected to the first network 110 and which is also set up such that the mapping module 101 can read in and output settings according to the first real-time mechanism. A second interface 104 is provided in order to connect the mapping module 101 to the second network 120. This second interface is also set up such that the mapping module 101 can read in and output settings according to the second real-time mechanism.

The router 100 may also have a distributor or switch 103 for the first network 110, for example in the form of a TSN real-time routing unit or a TSN switch. The machine components 112, 113, 114, 115, 116 can be connected to corresponding connections or ports 112a, 113a, 114a, 115a, 116a of the TSN switch 103 and can therefore be connected to one another.

The router 100 also has a 5G modem 105, for example. The modem 105 can be connected to the 5G mobile radio network via a corresponding connection or port 121a.

The router 100 now enables data transmission in real time between the machine, in particular the control device 112, in the first network 110 and the remote computing unit system 122 in the second network 120, with the result that open-loop or closed-loop control circuits of the machine can be closed via the remote computing unit system 122, for example as part of the "Industry 4.0".

Figure 2:
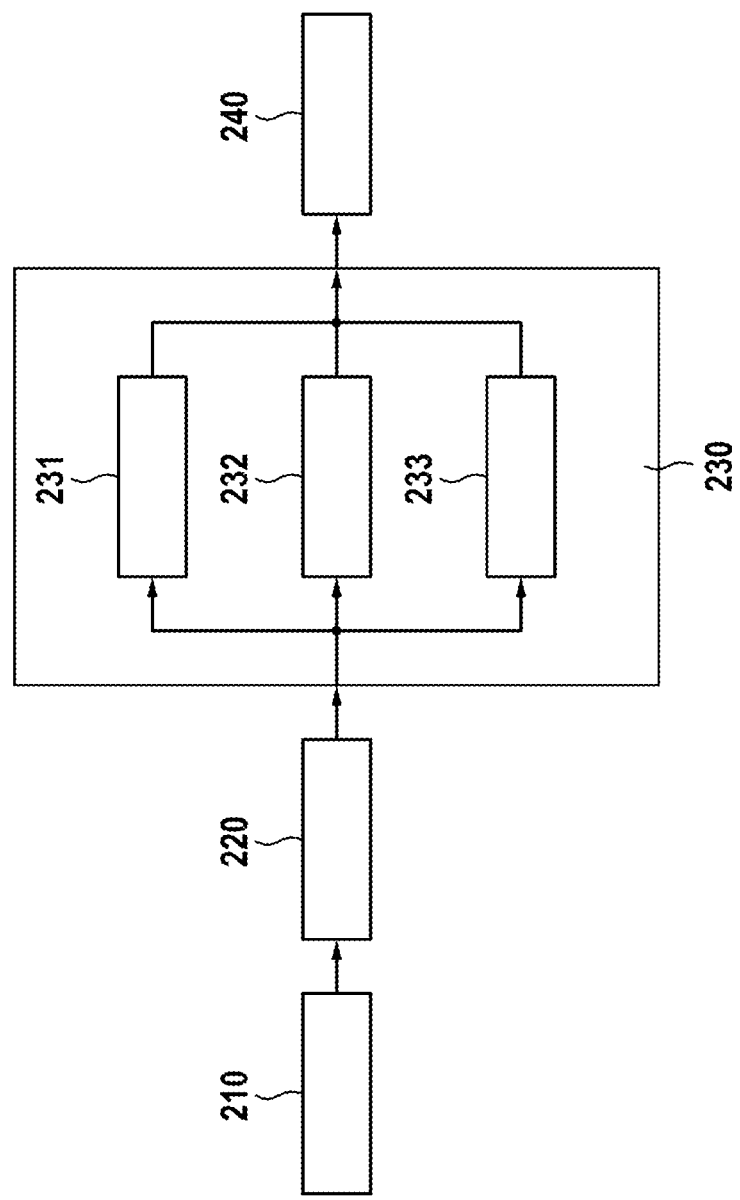
FIG. 2 schematically shows a preferred embodiment of a method according to the disclosure in the form of a block diagram.

For this purpose, the router 100 is set up, in particular in terms of programming, to carry out a preferred embodiment of a method according to the disclosure which is schematically illustrated in FIG. 2 in the form of a block diagram and is explained below with reference to FIGS. 1 and 2.

For example, in the course of closed-loop control of the machine, the control device 112 transmits sensor values from the sensors 115, 116 in real time to the remote computing unit system 122, where control values are determined on the basis of these sensor values, which control values are in turn transmitted from the remote computing unit system 122 in real time to the control device 112 so that the control device 112 controls the actuators 113, 114 according to these control values.

The situation in which the control device 112 transmits sensor values in a data packet in real time to the remote computing unit system 122 is considered, by way of example, below.

In a step 210, special settings are first of all made in the first network 110 according to the real-time mechanism of the communication system 111; in particular, the network subscribers 112, 113, 114, 115, 116 of the first network 110 are synchronized in this case and a common time base is created. Furthermore, time slots are defined and reserved for the purpose of allocating data transmission capacities.

In step 220, the control device 112 transmits the corresponding data packet in the first network 110 and allocates special settings to this data packet according to the first real-time mechanism of the first communication system 111, in particular a special priority.

In step 230, the mapping module 101 maps the real-time mechanism of the field bus or of the first communication system 111 to the second real-time mechanism of the 5G mobile radio network or of the second communication system 121.

For this purpose, the mapping module 101 maps the real-time mechanisms relating to the prioritization of the data packet to one another in step 231. In this case, the mapping module 101 maps the corresponding settings with respect to the priority according to the first real-time mechanism to settings according to the second real-time mechanism.

The first real-time mechanism relating to the prioritization of data packets based on TSN standards is based, for example, on the standards IEEE 802.3, IEEE 802.1Qbu and IEEE 802.1Qbv. The second real-time mechanism relating to the prioritization of data packets based on 5G standards is based, for example, on the 3GPP TS 23.501, Access Class Barring (ACB), Allocation and Retention Priority (ARP) etc.

According to the first real-time mechanism based on TSN standards, the prioritization of the data packet can be stipulated on the basis of the MAC address and the VLAN tag (IEEE 802.3). Although these fields are primarily used for different purposes, a reference of the MAC address and VLAN tag to a specific priority is additionally configured. Packets can preferably be forwarded according to this priority (IEEE 802.1Qbu, IEEE 802.1Qbv).

According to the second real-time mechanism based on 5G standards, a so-called "Quality of Service Flow Identifier" (QFI) is used. Data packets having the same QFI are handled consistently and are thus prioritized.

These different real-time mechanisms are mapped to one another by means of the mapping module 101. A table which assigns a priority in the TSN network, represented by tuples of the MAC address and VLAN tag, to a priority of the 5G QFI is defined for this purpose, for example.

This mapping is performed during the transition between the two communication systems 111, 121 in the router 100, that is to say when data packets are intended to be transmitted from one communication system to the other. As a result, the priority of the packets is concomitantly transferred.

In the present example, the mapping module 101 now maps the tuple of the MAC address and VLAN tag of the data packet to the corresponding QFI in step 231.

Furthermore, the mapping module 101 transfers settings in the first network 110 according to the first real-time mechanism to the second network 120 according to the second real-time mechanism in steps 232 and 233, as explained below.

In step 232, the mapping module 101 maps the real-time mechanisms relating to the synchronization of network subscribers to one another.

The first real-time mechanism which is based on TSN standards and relates to synchronization is based, for example, on the standard IEEE 802.1AS. The second real-time mechanism which is based on 5G standards and relates to synchronization is based, for example, on the so-called "physical layer synchronization" and the standard IEEE 1588.

In particular, real-time mechanisms based on the standard IEEE 1588 are each used in the two communication systems, that is to say in the field bus 111 and in the 5G mobile radio network 121. Finer "physical layer synchronization", which can be used for more accurate synchronization with TSN, is additionally used in 5G, where, again on the basis of IEEE 1588 (see IEEE 802.1AS), more accurate synchronization is possible than in the case of 5G using only IEEE 1588.

In particular, the mapping module 101 then transfers the time base of the first communication system 111, that is to say of the field bus 111, to the 5G mobile radio network, that is to say to the second communication system 121, in step 232. In particular, the first network 110 is therefore considered to be a master, the setting of which is transferred to the second network 120 which acts as a slave.

In step 233, the mapping module 101 maps the real-time mechanisms relating to the allocation of data transmission capacities to one another.

The first real-time mechanism which is based on TSN standards and relates to allocation is based, for example, on the standards IEEE 802.3, IEEE 802.1Qbv, IEEE 802.1Qav and IEEE 802.1Qcc. The second real-time mechanism which is based on 5G standards and relates to allocation is based, for example, on 3GPP TS 23.501, Access Class Barring (ACB), Allocation and Retention Priority (ARP) etc.

The mapping module 101 now transfers the allocations, in particular the length of the time slots and their reservations, from the first network 110, which acts as the master, to the second network 120, which acts as the slave, in step 233.

In step 240, the data packet is transmitted from the router 100 to the second network 120 and finally to the remote computing unit system 122 according to the second real-time mechanism.

It is noted at this point that a transmission in the opposite direction, that is to say from the second network 120 to the first network, is carried out in a corresponding manner, wherein the mapping module 101 in this case maps the second real-time mechanism based on 5G standards to the first real-time mechanism based on TSN standards.

Figure 3:
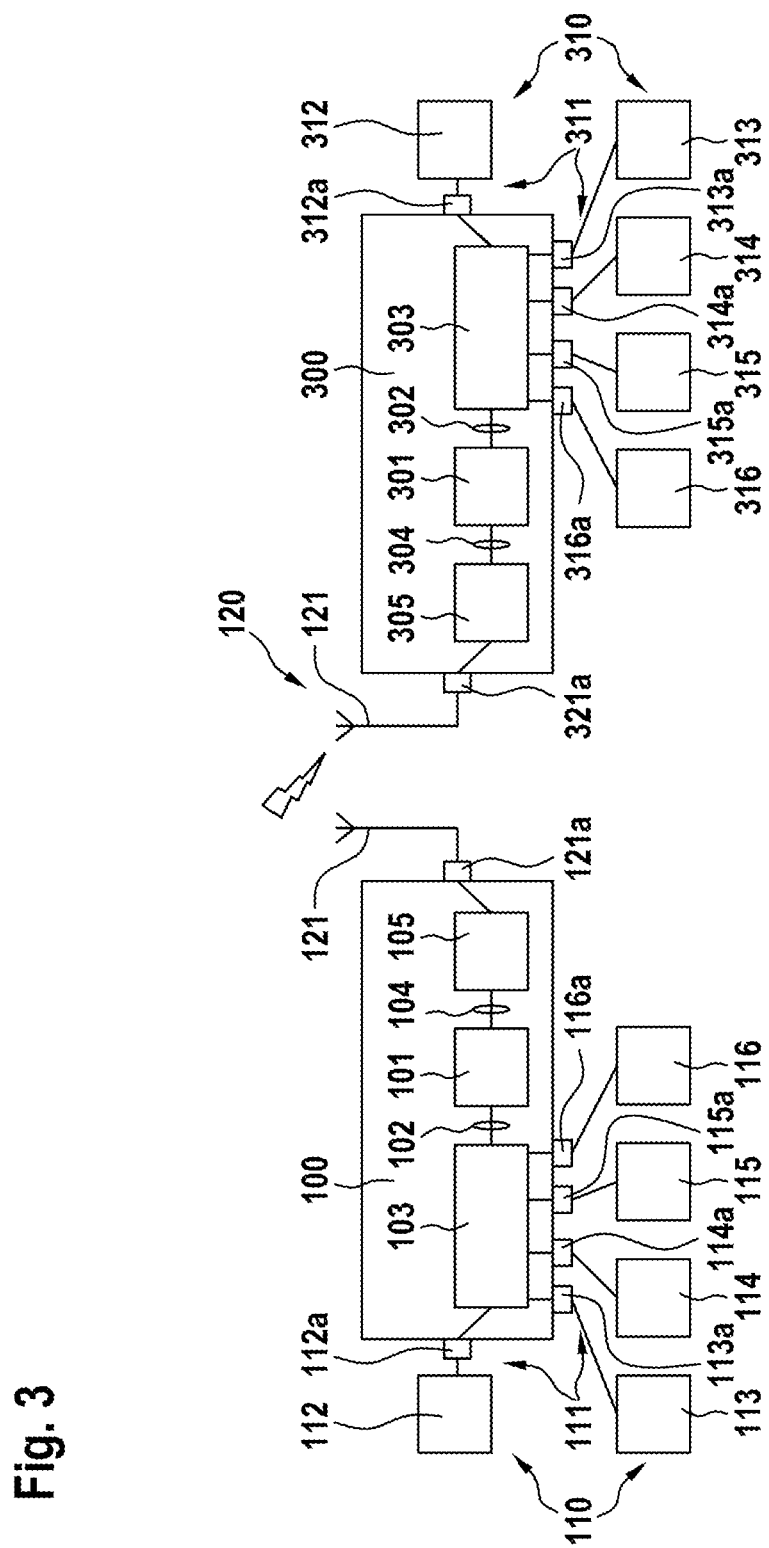
FIG. 3 schematically shows a system for real-time-capable data transmission between three networks having preferred configurations of an apparatus according to the disclosure which are each set up to carry out a preferred embodiment of a method according to the disclosure.

FIG. 3 schematically illustrates a system for real-time-capable data transmission between three networks according to one preferred configuration of the disclosure. Identical reference signs denote identical elements in FIGS. 1 and 3.

The example shown in FIG. 3 represents a possible way of networking the machine from FIG. 1 to a second machine, as an alternative or in addition to the remote computing unit system, via the Internet, in particular as part of the "Industry 4.0".

In a similar manner to FIG. 1, machine components of the machine are networked to one another in this case in the first network 110, for example the control device 112, actuators 113, 114 and sensors 115, 116. These machine components 112, 113, 114, 115, 116 are networked in the first network 110 via the first real-time-capable communication system 111 which is based on Ethernet, IEEE standards and also preferably on TSN standards and is, for example, in the form of a real-time-capable field bus based on Ethernet, for example Sercos III, EtherCAT, Profinet, Ethernet/IP etc.

The first network 110 is connected to the second network 120, which is based on 5G standards and is in the form of a 5G mobile radio network, via the router 100.

In a similar manner to the above description, the router 100 has the mapping module 101 and the interfaces 102, 104, the TSN switch 103 and the 5G modem 105.

A further machine is also connected to the 5G mobile radio network, that is to say the second network 120, in a corresponding manner in the system.

In a similar manner to the first machine, this second machine can also comprise components such as a control device 312, actuators 313, 314 and sensors 315, 316 which are networked to one another in a third network 310. It goes without saying that this second machine may also have yet further components.

In the third network 310, these machine components 312, 313, 314, 315, 316 are networked via a real-time-capable communication system 311 which, in a similar manner to the first communication system 111, is based on Ethernet, IEEE standards and also preferably on TSN standards. In particular, the real-time-capable communication systems 111 and 311 may be identical; for example, the same field bus can be used for the communication systems 111 and 311.

A second preferred configuration of an apparatus 300 according to the disclosure is provided in order to connect the third network 310 to the second network 120. In a similar manner to the router 100, the apparatus 300 is also in the form of a router having a mapping module 301 which is set up to reciprocally map the real-time mechanism of the real-time-capable communication system 311 and the real-time mechanism of the second real-time-capable communication system 121 to one another.

In a similar manner to the router 100, the router 300 also has corresponding interfaces 302, 304, a TSN switch 303 and a 5G modem 305. The machine components 312, 313, 314, 315 and 316 are connected to corresponding connections or ports 312a, 313a, 314a, 315a and 316a of the TSN switch 303. The modem 305 can be connected to the 5G mobile radio network 120 via a corresponding connection or port 321a.

The system now enables real-time-capable data transmission from the first network 110 to the third network 310 via the second network 120 and vice versa. For example, the control devices 112 and 312 can therefore communicate with one another in real time.

What is claimed is:

1. A method for real-time-capable data transmission between two networks, comprising:
   operating a first real-time-capable communication system having a first real-time mechanism for real-time-capable data transmission in a first network;
   operating a second real-time-capable communication system having a second real-time mechanism for real-time-capable data transmission in a second network;
   operably connecting the first network and the second network via a mapping module that reciprocally maps the first real-time mechanism and the second real-time mechanism to one another; and
   generating a data packet with a first subscriber of the first network according to the first real-time mechanism;
   transmitting the generated data packet to the mapping module;
   mapping the transferred data packet, with the mapping module, from the first real-time mechanism to the second real-time mechanism; and
   transmitting the mapped data packet to a second subscriber of the second network,
   wherein mapping the transmitted data packet from the first real-time mechanism to the second real-time mechanism includes an allocation of data transmission capacities by determining a time slot length of the transmitted data packet according to the first real-time mechanism and reserving a corresponding time slot having a corresponding length according to the second real-time mechanism in the second network,
   wherein the first real-time mechanism and the second real-time mechanism each relate to prioritization of data packets,
   wherein the prioritization of the data packets is determined based on a media access control address (MAC address) of the first subscriber and/or the second subscriber, and
   wherein the time slot length of the data packet according to the first real-time mechanism is different from the corresponding length of the corresponding time slot according to the second real-time mechanism.

2. The method according to claim 1, wherein mapping the transmitted data packet, further comprises:
   mapping, with the mapping module, (i) settings of the transmitted data packet to (ii) settings according to the real-time mechanism of the real-time-capable communication system in the second network.

3. The method according to claim 1, ,further comprising:
   transferring settings in the first network according to the first real-time mechanism to the second network according to the second real-time mechanism of the real-time-capable communication system.

4. The method according to claim 1, further comprising:
connecting the first network to the mapping module via a first interface, wherein the mapping module reads in settings and outputs settings according to the first real-time mechanism via the first interface; and/or
connecting the second network to the mapping module via a second interface, wherein the mapping module reads in settings and outputs settings according to the second real-time mechanism via the second interface.

5. The method according to claim 1, wherein at least one of the first real-time-capable communication system and the second real-time-capable communication system is based on Ethernet, IEEE 802 standards, and/or on TSN standards.

6. The method according to claim 1, wherein at least one of the first real-time-capable communication system and the second real-time-capable communication system is a real-time-capable mobile radio network and/or is based on 5G standards.

7. The method according to claim 1, further comprising:
reciprocally mapping the first real-time mechanism based on TSN standards and the second real-time mechanism based on 5G standards to one another with the mapping module.

8. An apparatus for real-time-capable data transmission between two networks, comprising:
a first interface connected to a first network;
a first real-time-capable communication system having a first real-time mechanism for real-time-capable data transmission, the first real-time-capable communication system operably connected to the first interface for operation in the first network;
a second interface connected to a second network;
a second real-time-capable communication system having a second real-time mechanism for real-time-capable data transmission, the second real-time-capable communication system operably connected to the second interface for operating in the second network; and
a mapping module operably connected to the first interface and the second interface and configured to reciprocally map the first real-time mechanism of the first real-time-capable communication system and the second real-time mechanism of the second real-time-capable communication system to one another,
wherein the mapping module is configured to map a data packet from the first real-time mechanism to the second real-time mechanism according to an allocation of data transmission capacities by determining a time slot length of the data packet according to the first real-time mechanism and reserving a corresponding time slot having a corresponding length according to the second real-time mechanism in the second network,
wherein the first real-time mechanism and the second real-time mechanism each relate to prioritization of data packets,
wherein the prioritization of the data packets is determined based on a media access control address (MAC address) of the first subscriber and/or the second subscriber, and
wherein the time slot length of the data packet according to the first real-time mechanism is different from the corresponding length of the corresponding time slot according to the second real-time mechanism.

9. The apparatus according to claim 8, wherein:
the first interface is configured such that the mapping module reads in settings and outputs settings according to the first real-time mechanism, and/or
the second interface is configured such that the mapping module reads in settings and outputs settings according to the second real-time mechanism.

10. The apparatus according to claim 8, wherein the mapping module is configured to reciprocally map the first real-time mechanism based on TSN standards and the second real-time mechanism based on 5G standards to one another.

11. A system for real-time-capable data transmission, comprising:
a first network having at least one first network subscriber,
a first real-time-capable communication system having a first real-time mechanism for real-time-capable data transmission, the first real-time-capable communication system set up in the first network;
a second network having at least one second network subscriber,
a second real-time-capable communication system having a second real-time mechanism for real-time-capable data transmission, the second real-time-capable communication system set up in the second network; and
an apparatus configured to connect the first network and the second network to one another, the apparatus including
a first interface connected to the first network,
a second interface connected to the second network, and
a mapping module connected to the first and the second interfaces and configured to reciprocally map the first real-time mechanism of the first real-time-capable communication system and the second real-time mechanism of the second real-time-capable communication system to one another,
wherein the mapping module is configured to map a data packet from the first real-time mechanism to the second real-time mechanism according to an allocation of data transmission capacities by determining a time slot length of the data packet according to the first real-time mechanism and reserving a corresponding time slot having a corresponding length according to the second real-time mechanism in the second network,
wherein the first real-time mechanism and the second real-time mechanism each relate to prioritization of data packets,
wherein the prioritization of the data packets is determined based on a media access control address (MAC address) of the first subscriber and/or the second subscriber, and
wherein the time slot length of the data packet according to the first real-time mechanism is different from the corresponding length of the corresponding time slot according to the second real-time mechanism.

12. The system for real-time-capable data transmission of claim 11, further comprising:
a third network in which the first real-time-capable communication system having the first real-time mechanism for real-time-capable data transmission or a third real-time-capable communication system having the third real-time mechanism for real-time-capable data transmission is set up,
wherein the apparatus is a first apparatus,
wherein the system further includes a second apparatus configured to connect the second network and the third network to one another, and
wherein the second apparatus includes
a third interface connected to the second network,
a fourth interface connected to the third network, and another mapping module connected to the third and the fourth interface and configured to reciprocally map the second real-time mechanism of the second real-time-capable communication system and the third real-time mechanism of the third real-time-capable communication system to one another.

13. The method according to claim 1, wherein a computer program causes a computing unit to carry out the method when the computer program is executed on the computing unit.

14. The method according to claim 13, wherein a non-transitory machine-readable storage medium has the computer program stored thereon.

\* \* \* \* \*